March 4, 1930.

R. J. EMMERT 1,749,329

GRINDING APPARATUS

Filed Sept. 14, 1925

Inventor
Rodger J. Emmert
By Spencer Duvall & Hardman
his Attorneys

Patented Mar. 4, 1930

1,749,329

UNITED STATES PATENT OFFICE

RODGER J. EMMERT, OF ANDERSON, INDIANA, ASSIGNOR, BY MESNE ASSIGNMENTS, TO DELCO-REMY CORPORATION, OF DAYTON, OHIO, A CORPORATION OF DELAWARE

GRINDING APPARATUS

Application filed September 14, 1925. Serial No. 56,188.

This invention relates to apparatus for grinding cylindrical bodies and more particularly the field frames of dynamo-electric machines.

It has been the practice, in making field frames for small generators and motors, to form a blank of flat sheet metal into a cylindrical form and weld the seam so as to form a continuous tubular body. There is generally an excess amount of welding material which, on cooling, adheres to the cylindrical surface at the seam, and this material must be removed in order that the exterior surface of the cylindrical frame will have a neat appearance.

One of the objects of the present invention is to provide a machine which will rapidly remove the excess welding material at the seam of the cylindrical tube in order to reduce materially the cost of manufacture of cylindrical tubes. In order to carry out this object, the invention comprises a conveyor for moving endwise a cylindrical tube between the suitably-formed grinding wheel and the guiding surfaces which locate the cylinder correctly with respect to the grinding wheel. Means are provided for resurfacing the grinding wheel periphery in case it wears away in an irregular manner; and the entire conveying mechanism and guiding device are adjustable relative to the wheel, so that as the wheel is worn down toward its axis, adjustments may be made so that the operation of the grinding wheel upon the cylinder remains practically the same.

Further objects and advantages of the present invention will be apparent from the following description, reference being had to the accompanying drawings, wherein a preferred form of embodiment of the present invention is clearly shown.

Figure 1:
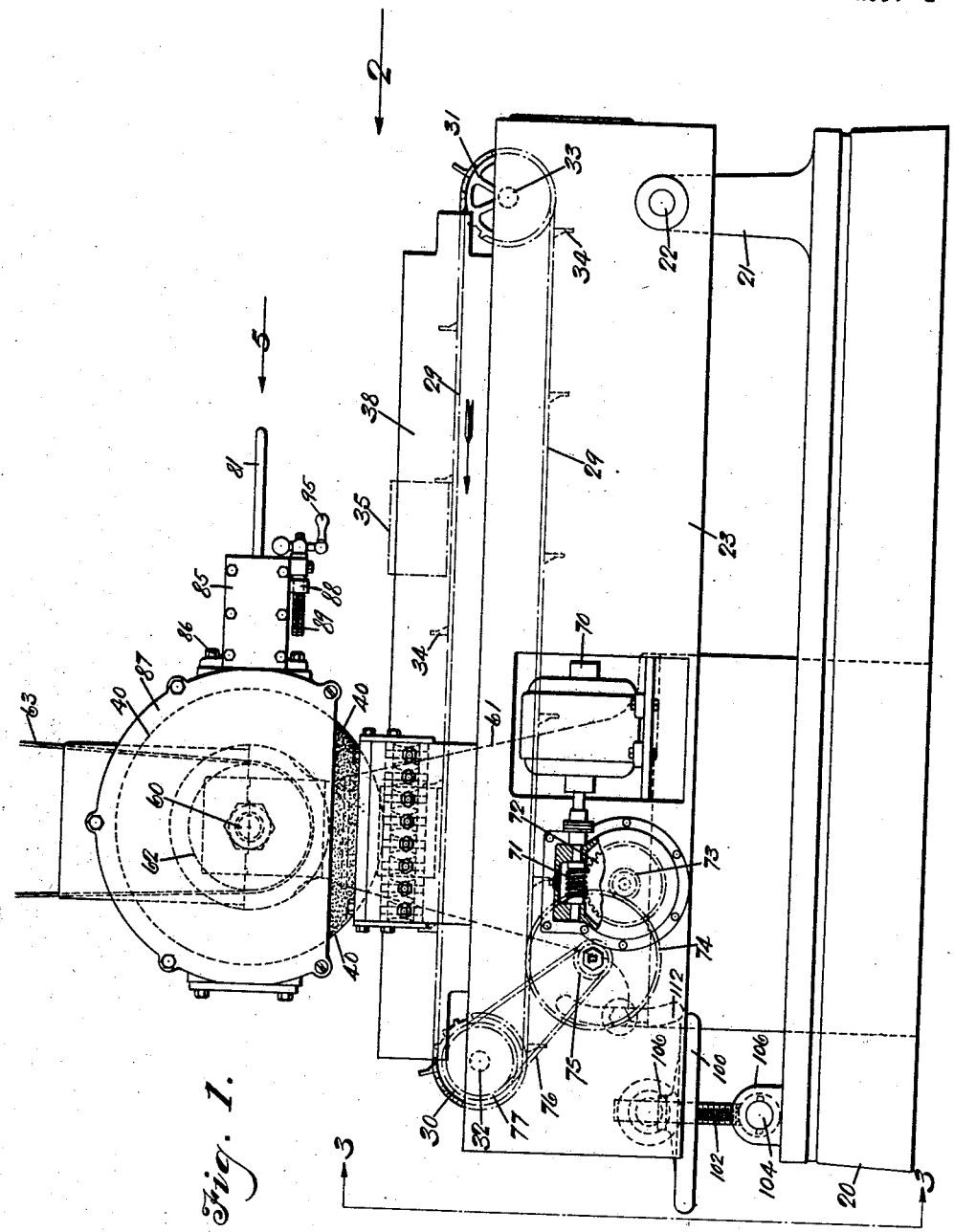
Fig. 1 is a side elevation partly in section, of a grinding machine embodying the present invention.
Figure 2:
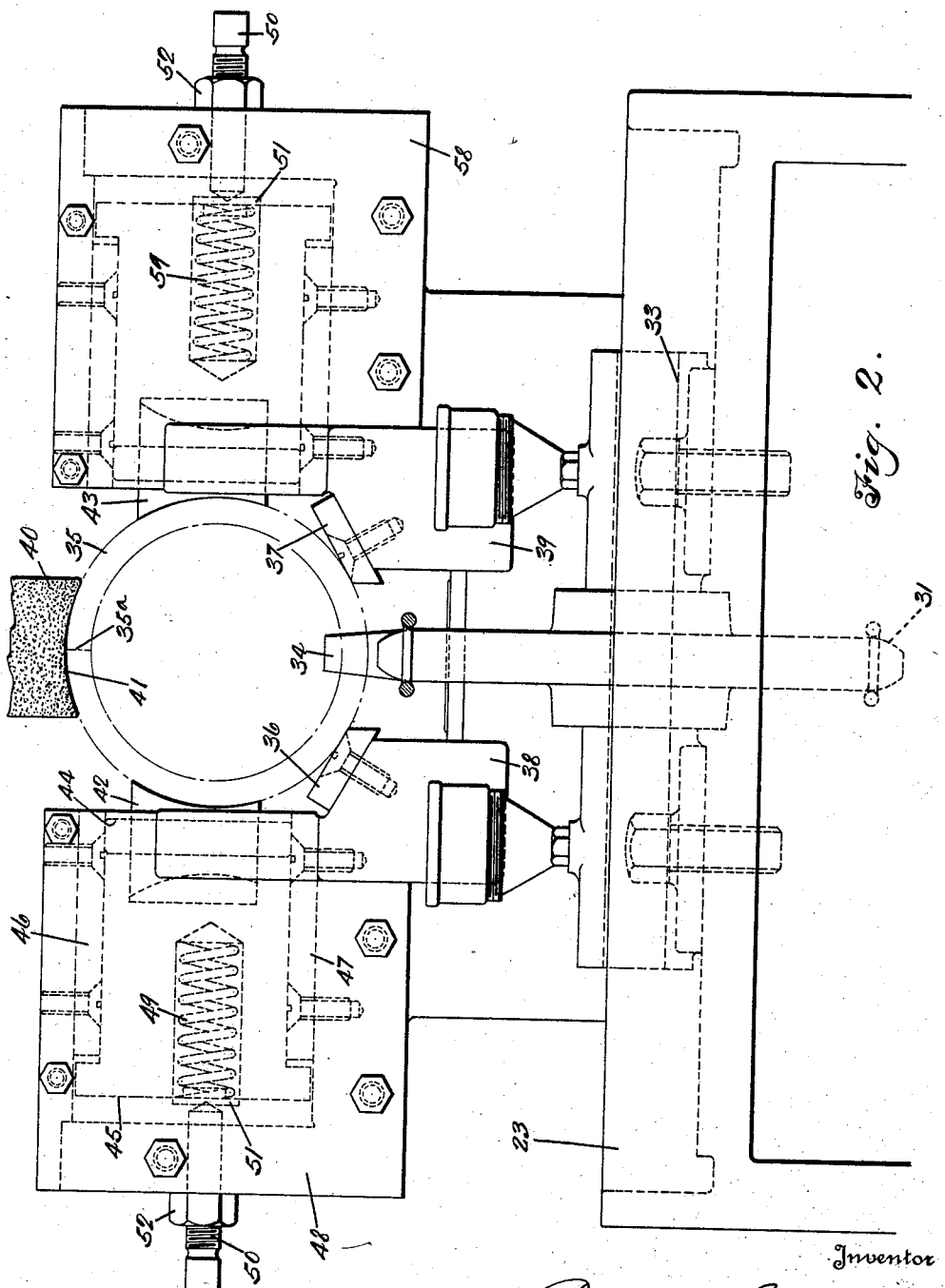
Fig. 2 is a fragmentary view on a larger scale than Fig. 1, looking in the direction of the arrow 2 in Fig. 1.

Referring to the drawings, 20 designates a base having a post 21 carrying a hinge pin 22 for pivotally supporting a conveyor frame 23 which is channel-shaped in cross-section, and is provided with side flanges 24 and 25 connected by a web portion 26 including a U-shaped portion 27, which provides a groove 28 for receiving a conveyor chain 29. The chain 29 is brought around sprocket wheels 30 and 31 which are carried by shafts 32 and 33, respectively, which are supported respectively by the left-hand and right-hand ends of the conveyor frame 23, as viewed in Fig. 1. The chain 29 carries a plurality of spaced lugs 34 for engaging tubular bodies 35 which are operated upon by the machine. The lugs 34 push the tubes 35 along inclined guides 36 and 37 which are supported by brackets 38 and 39, respectively. The guides 36 and 37, and the vertical walls of the brackets 38 and 39, provide a sort of trough for receiving the work pieces 35. The conveyor chain 29 is operated to move the work pieces 35 toward the left of Fig. 1, and under an abrasive wheel 40 which is provided with a grooved periphery 41 having a cross-sectional contour which conforms to the curvature of the exterior of the work piece 35. As the work pieces 35 pass under the grinding wheel 40, the excess welding material at the seam, indicated by numeral 35ª, will be removed. While the work 35 is being operated upon by the wheel, it is guided not only by the inclined guides 36 and 37, but also by a group of rollers 42 and a group of rollers 43, located respectively at the left-hand side and at the right-hand side of the work 35, as viewed in Fig. 2. Each of the rollers 42 is rotatable around a spindle 44 supported by a block 45 which is movable in the direction parallel to the axis of the grinding wheel 40 and is guided between guide blocks 46 and 47 and between the adjacent surfaces of the blocks 45 which are located adjacent thereto. The blocks 46 and 47 are attached to a block 48, supported by the conveyor frame 38. Each of the blocks 45 is yieldingly urged toward the work by a spring 49, the compression of which is adjusted by a screw 50, threadedly engaging the bracket 48 and contacting with a button 51, which in turn presses against the spring 49. The screw 50 is held in adjusted position by a nut 52. Each of the rollers 43 is supported in like manner, by the bracket 58, and each is yieldingly urged toward the work pieces 35 by a spring 59. The guides 36 and 37 and the rollers 42 and 43 tend to centralize the work pieces 35, so that the surface ground off by the grinding wheel 40 will be substantially concentric with and coincidental with the remaining portion of the exterior cylindrical surface of each work piece.

The grinding wheel 40 is mounted on a shaft 60, which is rotatably supported by a bracket 61, and the shaft 60 carries a driven pulley 62 which is operated from a driving pulley (not shown), by a belt 63.

The conveyor chain 29 is moved by an electric motor 70 which drives a worm 71 meshing with a worm gear 72 which in turn drives a spur gear 73 meshing with a spur gear 74. Gear 74 drives a sprocket 75 connected by a pin 76 with a sprocket 77. Sprocket 77 is connected with the shaft 32, which supports the conveyor sprocket 30.

The periphery 41 of the grinding wheel 40 may be dressed off to produce the desired grinding surface, by a dressing tool 80 carried at one end of a handle 81, which turns about a pin 82 carried by a block 83, which is removably supported by an adjustable frame 84 which slides endwise through a frame 85 attached by screws 86 to a housing 87 for the grinding wheel 40. Housing 87 is supported by bracket 61 in any suitable manner. The frame 84 carries a threaded lug 88, which receives a screw 89 provided on a screw shaft 90 which is rotatably supported by a bracket 91 attached by screws 92 to the bracket 85. Collars 93 and 94 prevent endwise movement of the shaft 90. By turning the handle 95, which is attached to the shaft 90, the frame 84 may be adjusted endwise so as to move the dressing tool 80 into contact with the grinding wheel 40. The handle is rotated about the pin 82 so that the teeth of the dressing tool 80 will travel through an arc having a radius of curvature substantially the same as the radius of the exterior surface of the work piece 35. As the grinding wheel wears away, the handle 95 is turned so as to move the dressing tool 80 toward the axis of the grinding wheel, in order that by manipulation of the lever 81, the grinding wheel 40 may be given the desired contour at its periphery. The block 83 is detachably secured to the frame 84 by a leaf spring member 96, having one end attached at 97 to the block 83 and the other end carrying a pin 98 which engages a hole 99 in the frame 84. By moving the spring 96 upwardly to move the pin 98 out of the hole 99, the block 83, handle 81 and tool 80 may be removed from the frame 84 without requiring said frame to be removed from the bracket 85.

Figure 3:
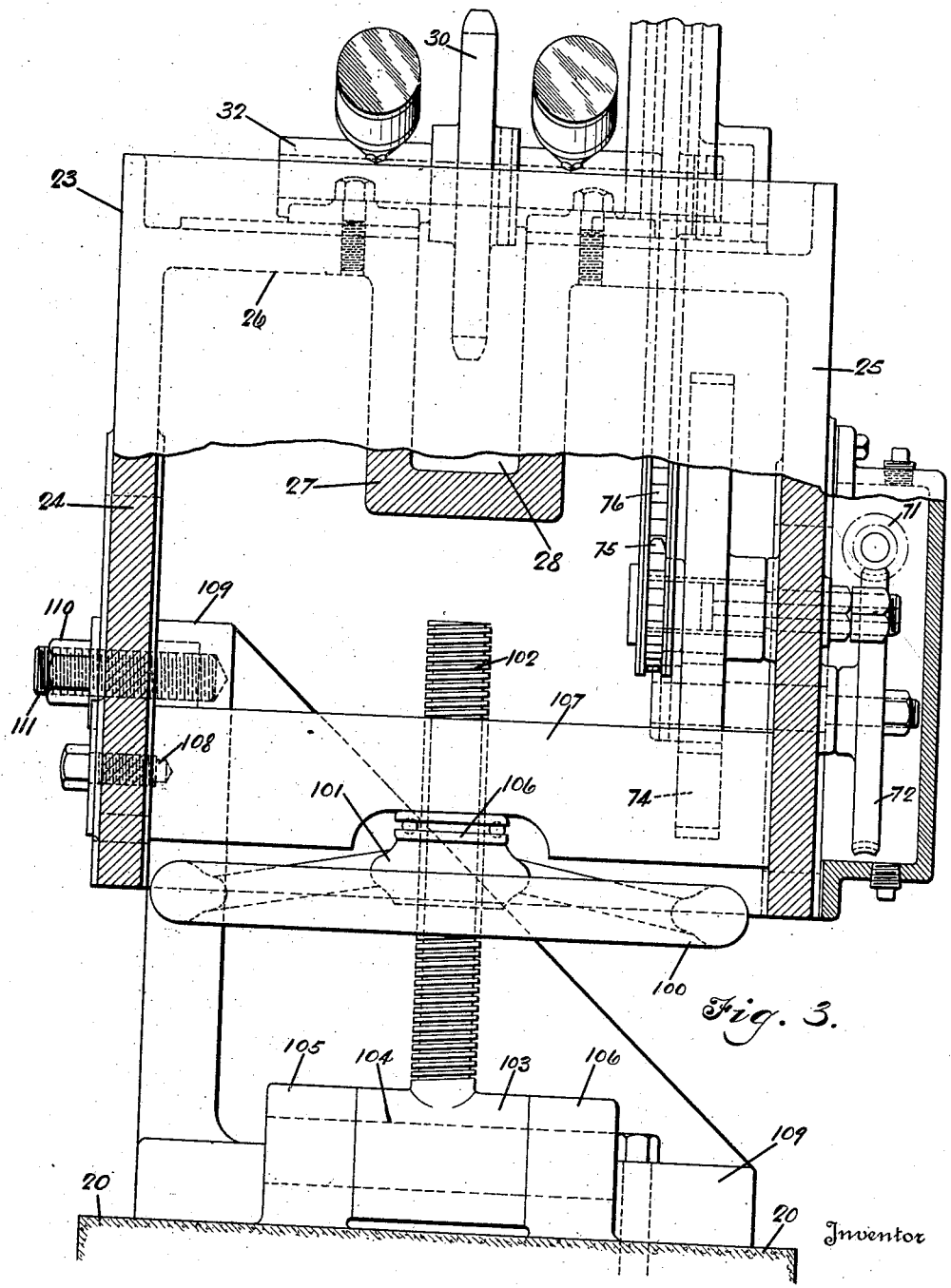
Fig. 3 is an end view on the same scale as Fig. 2, taken on the plane of line 3—3.
Figure 4:
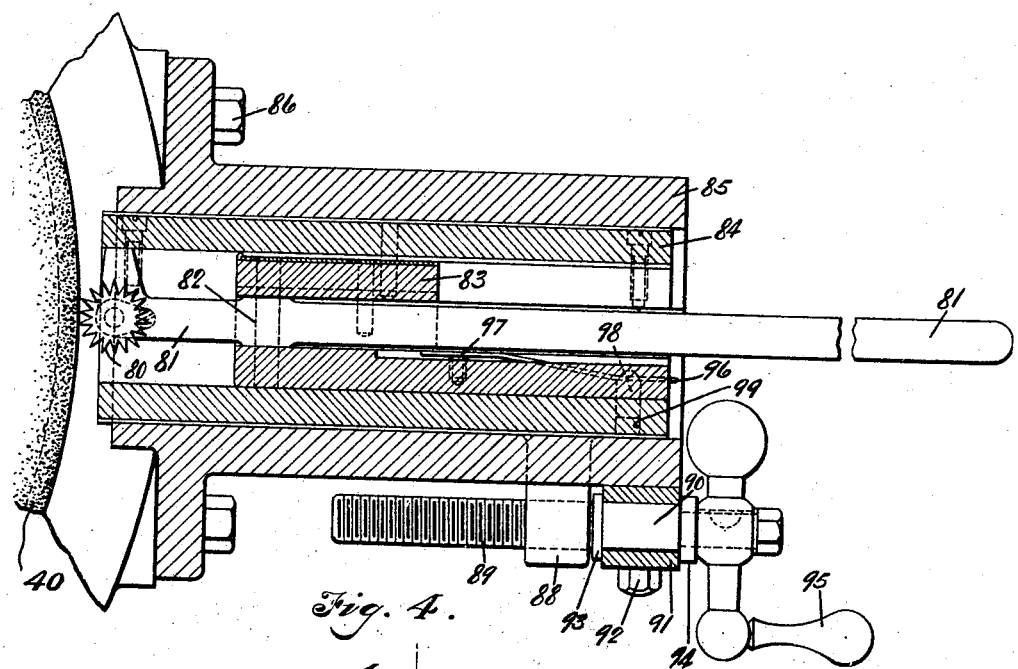
Fig. 4 is a sectional view on the line 4—4 of Fig. 5.
Figure 5:
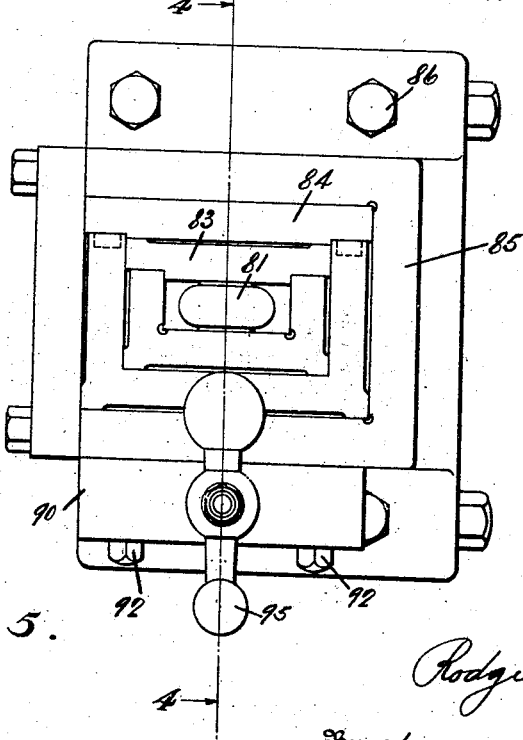
Fig. 5 is an end view in the direction of the arrow 5 in Fig. 1, of the grinding wheel dressing device.

As the wheel 40 is worn away after each dressing operation, the conveyor frame 23 must be tilted in a clockwise direction about its pivot pin 22 in order to move the work pieces into such a position that they will be moved by the conveyor into contact with the grinding wheel 40. Movement of the conveying frame 23 about its pivot 22 is accomplished by turning a hand wheel 100 having its hub 101 threaded to cooperate with a screw 102. The screw 102 is integral with a hub 103 supported by a pin 104 carried by brackets 105 and 106 extending from the base 20. The hub 101 of hand wheel 100 bears against a ball-thrust bearing 106, which in turn bears against a cross-frame member 107, having its ends pivotally connected with the flange members 24 and 25 of the conveyor frame 23. The cross frame 107 is pivoted upon screws 108, which are threaded into the flange members 24 and 25. The conveyor frame is secured in adjusted position by clamping the flange portion 24 against a bracket 109, which is secured to the base 20. This is accomplished by turning a nut 110 on a stud 111 which is tightly threaded into the bracket 109 and passes through a slot 112 in the flange portion 24 of the conveyor frame 23. It will readily be seen from Fig. 3 that if the wheel 100 is turned so that a visible point on its periphery is moved from left to right as viewed in Fig. 3, the hub 101 will move upwardly along the screw 102 so as to tilt the conveyor frame 23 in a clockwise direction about the bracket 21.

While the form of embodiment of the present invention as herein disclosed, constitutes a preferred form, it is to be understood that other forms might be adopted, all coming within the scope of the claims which follow.

What is claimed is as follows:

1. Apparatus for grinding portions of the exteriors of cylinders comprising, in combination, a non-adjustable rotary abrasive wheel having a concaved periphery conforming to the contour of said cylinders and for engaging the cylinders, means for moving the cylinders endwise and at right angles to the axis of the wheel, members having flat, angularly arranged guiding surfaces lying in converging V-planes upon which the cylinders slide while moving against the wheel, and a plurality of concaved guiding rollers yieldingly urged against and fitting upon opposite sides of the cylinders.

2. Grinding apparatus comprising, in combination, a non-adjustable, rotary, abrasive wheel; a frame adjustable relative to the wheel; a conveyor on said frame for delivering work pieces to the wheel; and guide members on the frame adjacent the wheel and on each side of the conveyor so that said conveyor is movable therebetween for maintaining the work pieces in proper alignment with the wheel, certain of said guide members being rigidly secured to the frame, others being yieldingly supported thereon.

3. Grinding apparatus comprising, in combination, a non-adjustable, rotary abrasive wheel; a frame provided with a conveyor for delivering work pieces to said wheel; means including inclined guides and yieldable rollers supported by the frame on each side of the conveyor so that the conveyor moves therebetween for maintaining the work pieces in proper alignment with the wheel; a base to which one end of the frame is pivotally secured; and adjustable means carried by the base for supporting the other end of the frame, and by means of which the conveyor, guides and yieldable rollers may be adjusted relative to the wheel.

4. Grinding apparatus comprising, in combination, a base; a rotary, abrasive wheel non-adjustably supported on said base; a frame supported on the base; oppositely disposed blocks on the frame so arranged to have the edge of the wheel interposed therebetween; a plurality of supporting members slidably carried in the respective blocks; a concaved roller rotatably mounted on each of said supporting members; resilient means carried by each supporting member, normally holding the said member in such position that its respective roller extends into the space between the blocks; an inclined guide member carried by each of said blocks; and a conveyor on the frame, comprising means for moving work pieces into engagement with the inclined guides and concaved rollers which cooperate to maintain the work piece in proper alignment with the wheel.

5. Grinding apparatus comprising in combination a frame, a grinding wheel non-adjustably supported on the frame, a conveyor including means for moving work pieces into engagement with the grinding wheel, and a guide way adjacent the wheel to hold the work pieces in proper alignment therewith, said guide way comprising spaced blocks having tracks upon which the work pieces are slid toward the wheel and spring loaded members adapted to engage the work pieces and maintain them in proper engagement with the tracks.

6. Grinding apparatus comprising in combination a frame, a grinding wheel non-adjustably supported on the frame, a conveyor including means for moving work pieces into engagement with the grinding wheel, and a guide way adjacent the wheel to hold the work pieces in proper alignment therewith, said guide way comprising spaced, stationary blocks each one of which has an inclined surface sloping downwardly toward the opposite block and providing a track along which the conveyor is adapted to move the work piece into engagement with the grinding wheel, each block having also a spring loaded member adapted to engage the work piece and maintain it upon the inclined surfaces of the blocks.

7. Grinding apparatus comprising in combination, a frame, a grinding wheel non-adjustably supported on the frame, a conveyor including means for moving work pieces into engagement with the grinding wheel, and a guide way adjacent the wheel to hold the work pieces in proper alignment therewith, said guide way comprising spaced, stationary blocks each one of which provides an inclined surface sloping downwardly toward the opposite block and providing a track for the work pieces, each block having also a concave roller resiliently supported thereon, the rollers being so formed that they will engage the work pieces and press them downwardly upon the track.

8. Grinding apparatus comprising in combination a frame, a grinding wheel non-adjustably supported on the frame, a conveyor including means for moving work pieces into engagement with the grinding wheel, and a guide-way adjacent the wheel to hold the work pieces in proper alignment therewith, said guide-way comprising spaced, stationary blocks each one of which provides an inclined surface sloping downwardly toward the opposite block and providing a track for the work pieces, a member slidably supported by each block; a concaved roller rotatably carried by each member, said rollers being adapted to engage and fit upon the work piece substantially above the plane passing horizontally through the center of the work piece; and a spring in each member, urging the respective member toward the work piece whereby the respective rollers will exert a wedging effort upon the work piece to maintain it upon the track.

In testimony whereof I hereto affix my signature.

RODGER J. EMMERT.